United States Patent
Ernst et al.

(10) Patent No.: US 11,125,139 B2
(45) Date of Patent: Sep. 21, 2021

(54) WASTE HEAT RECOVERY VEHICLE COOLING OPTIMIZATION

(71) Applicant: CUMMINS INC., Columbus, IN (US)

(72) Inventors: Timothy C. Ernst, Columbus, IN (US); Christopher R. Nelson, Columbus, IN (US); Jared Carpenter Delahanty, Franklin, IN (US)

(73) Assignee: Cummins Inc., Columbus, IN (US)

( * ) Notice: Subject to any disclaimer, the term of this patent is extended or adjusted under 35 U.S.C. 154(b) by 93 days.

(21) Appl. No.: 16/342,315

(22) PCT Filed: Oct. 19, 2017

(86) PCT No.: PCT/US2017/057427
§ 371 (c)(1),
(2) Date: Apr. 16, 2019

(87) PCT Pub. No.: WO2018/080895
PCT Pub. Date: May 3, 2018

(65) Prior Publication Data
US 2019/0249589 A1    Aug. 15, 2019

Related U.S. Application Data

(60) Provisional application No. 62/412,005, filed on Oct. 24, 2016.

(51) Int. Cl.
*F01P 1/06* (2006.01)
*F25B 27/02* (2006.01)
(Continued)

(52) U.S. Cl.
CPC .............. *F01P 1/06* (2013.01); *F01K 7/18* (2013.01); *F01K 7/38* (2013.01); *F01K 23/065* (2013.01);
(Continued)

(58) Field of Classification Search
CPC ........ F01P 1/06; F01P 5/02; F01P 7/02; F01K 7/18; F01K 7/38; F01K 23/065
See application file for complete search history.

(56) References Cited

U.S. PATENT DOCUMENTS 3,934,644 A * 1/1976 Johnston ................ B60K 11/04
                                                                   165/51
4,896,830 A    1/1990 Takamatsu
(Continued)

FOREIGN PATENT DOCUMENTS

| CN | 1677022 | 10/2005 |
|---|---|---|
| CN | 104727912 | 6/2015 |
| WO | WO-2015/197091 A | 12/2015 |

OTHER PUBLICATIONS

Office Action for CN Application No. 2017800647051, dated Jun. 29, 2020.
(Continued)

*Primary Examiner* — Kevin A Lathers
(74) *Attorney, Agent, or Firm* — Foley & Lardner LLP

(57) ABSTRACT

An engine cooling system comprises an engine cooling circuit, comprising a first pump structured to circulate engine coolant fluid therethrough. A remote coolant radiator positioned along the engine cooling circuit downstream of the engine and outside of a vehicle cooling package area is structured to transfer heat from the engine coolant fluid to air. A coolant heat exchanger is positioned along the engine cooling circuit in parallel to the remote coolant radiator. A waste heat recovery system comprises a working fluid circuit comprising a second pump. The coolant heat exchanger is positioned along the working fluid circuit and is structured to transfer heat from the engine coolant fluid to the working fluid. An expander is structured to convert energy from the heat transferred to the working fluid from the engine cooling fluid to mechanical energy. A condenser positioned downstream of the expander is structured to cool the working fluid.

27 Claims, 11 Drawing Sheets

(51) Int. Cl.
*F02G 5/02* (2006.01)
*F01K 7/18* (2006.01)
*F01K 7/38* (2006.01)
*F01K 23/06* (2006.01)
*F01P 5/02* (2006.01)
*F01P 7/02* (2006.01)

(52) U.S. Cl.
CPC .................. *F01P 5/02* (2013.01); *F01P 7/02* (2013.01); *F02G 5/02* (2013.01); *F25B 27/02* (2013.01); *Y02A 30/274* (2018.01); *Y02T 10/12* (2013.01)

(56) References Cited

U.S. PATENT DOCUMENTS

| | | | |
|---|---|---|---|
| 7,181,919 B2* | 2/2007 | Uno | B60H 1/32 62/157 |
| 8,302,399 B1 | 11/2012 | Freund et al. | |
| 8,628,025 B2 | 1/2014 | Bucknell | |
| 8,739,531 B2* | 6/2014 | Teng | F01K 13/02 60/618 |
| 9,234,482 B2 | 1/2016 | Bromberg et al. | |
| 2007/0245737 A1 | 10/2007 | Inaba et al. | |
| 2008/0041046 A1 | 2/2008 | Bering | |
| 2011/0271677 A1 | 11/2011 | Teng et al. | |
| 2012/0192560 A1* | 8/2012 | Ernst | F02M 26/25 60/616 |
| 2015/0308372 A1 | 10/2015 | Gibble | |
| 2015/0354414 A1 | 12/2015 | Gibble | |

OTHER PUBLICATIONS

International Search Report and Written Opinion from corresponding PCT Application No. PCT/US2017/057427, dated Jan. 3, 2018, pp. 1-11.

* cited by examiner

WASTE HEAT RECOVERY VEHICLE COOLING OPTIMIZATION

CROSS-REFERENCE TO RELATED APPLICATIONS

This application is the U.S. national phase PCT Application No. PCT/US2017/057427, filed Oct. 19, 2017, which claims the benefit of and priority to U.S. Provisional Patent Application No. 62/412,005, filed Oct. 24, 2016, the contents of which are incorporated herein by reference in their entireties.

TECHNICAL FIELD

The present disclosure relates generally to the field of cooling systems for internal combustion engine systems.

BACKGROUND

In operation, internal combustion engines discharge heat energy into the external environment through exhaust gas, engine cooling systems, charge air cooling systems, etc. The discharged heat energy that is not used to perform useful work is typically known as "waste heat." Waste heat recovery ("WHR") systems capture a portion of the waste heat to perform useful work, such as generating electrical energy via an expander (e.g., a turbine) coupled to a generator. Some WHR systems use a Rankine cycle ("RC"). The RC is a thermodynamic process in which heat is transferred to a working fluid in an RC circuit. The working fluid is pumped to a boiler where it is vaporized. The vapor is passed through an expander and then through a condenser, where the vapor is condensed back to a fluid. The expander may drive a generator to generate electrical energy. An Organic Rankine cycle ("ORC") is an RC in which the working fluid is an organic, high molecular mass fluid with a liquid-vapor phase change at a lower temperature than that of water. Such a fluid allows for heat recovery from relatively lower temperature sources relative to other RC systems.

SUMMARY

In various embodiments, a system comprises an engine cooling system, including an engine cooling circuit. The engine cooling circuit comprises a first pump structured to circulate an engine coolant fluid through the engine cooling circuit. A remote coolant radiator is positioned along the engine cooling circuit downstream of the engine and positioned outside of a vehicle cooling package area. The remote coolant radiator is structured to transfer heat from the engine coolant fluid to air flowing through the remote coolant radiator. A coolant heat exchanger is positioned along the engine cooling circuit in parallel to the remote coolant radiator and upstream of the engine. A waste heat recovery system comprises a working fluid circuit including a second pump structured to circulate a working fluid through the working fluid circuit. The coolant heat exchanger is positioned along the working fluid circuit and is structured to transfer heat from the engine coolant fluid to the working fluid. An expander is positioned along the working fluid circuit downstream of the coolant heat exchanger. The expander is structured to convert energy from the heat transferred to the working fluid from the engine cooling fluid to mechanical energy. A condenser is positioned along the working fluid circuit downstream of the expander. The condenser is structured to cool the working fluid.

In various other embodiments, a vehicle system includes an engine bay and an engine positioned in the engine bay. An engine cooling system includes an engine cooling circuit including a first pump structured to circulate an engine coolant fluid through the engine cooling circuit. A coolant heat exchanger is positioned along the engine cooling circuit upstream of the engine. The coolant heat exchanger is structured to receive working fluid from a Rankine waste heat recovery system and to transfer heat from the engine coolant fluid to the working fluid.

In various other embodiments, an engine cooling system includes an engine cooling circuit that includes a first pump structured to circulate an engine coolant fluid through the engine cooling circuit. A coolant heat exchanger is positioned along the engine cooling circuit upstream of the engine. The coolant heat exchanger is structured to receive working fluid from a
Rankine waste heat recovery system and to transfer heat from the engine coolant fluid to the working fluid.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims.

Figure 1:
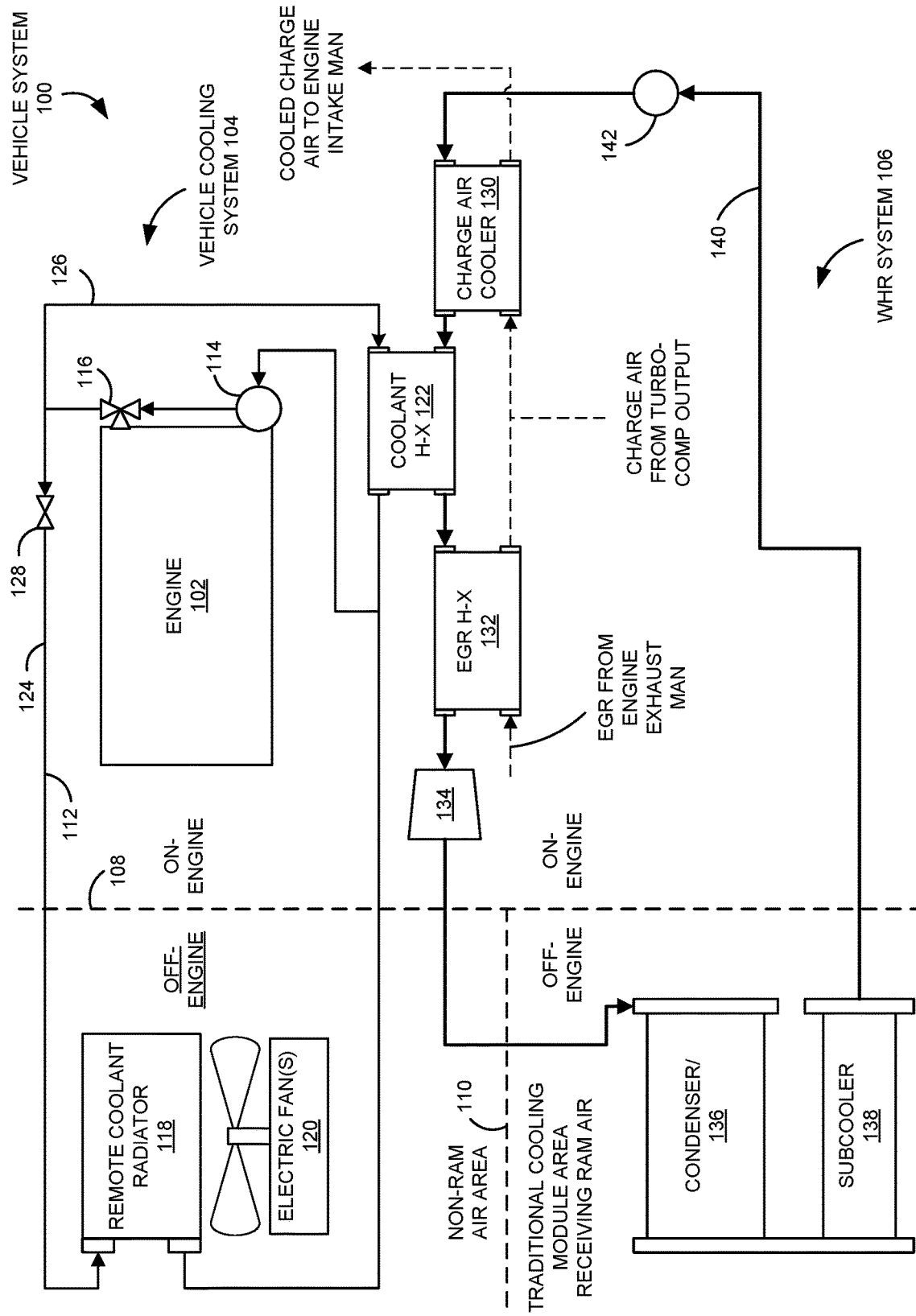
FIG. 1 is a schematic diagram illustrating a vehicle system, according to an example embodiment.

It will be recognized that the figures are representations for purposes of illustration. The figures are provided for the purpose of illustrating one or more implementations with the explicit understanding that they will not be used to limit the scope or the meaning of the claims.

DETAILED DESCRIPTION

Vehicle cooling systems operate to ensure that temperatures of engine and other vehicle components do not exceed rated operating temperature limits. A cooling system can include various components, such as a coolant radiator, a charge air cooler, an air conditioning condenser, a transmission cooler, etc. One or more cooling system components may be integrated into a cooling module. A cooling module is a structural unit that comprises multiple cooling components in a single integrated unit.

A coolant radiator or an entire cooling module can be positioned in a vehicle cooling package area, such as located in the engine bay proximate the engine. A vehicle cooling package area may be structured to receive ram air, which is air that is forced into the engine bay from the grill when the vehicle is in a forward motion. The coolant radiator or the cooling module is cooled by ram air and/or by air drawn therethrough by one or more fans positioned proximate the radiator or cooling module.

Vehicle cooling requirements have become more and more demanding because of increasingly stringent fuel efficiency demands, emissions regulations and packaging constraints, among other factors. For example, WHR systems may generate energy from waste heat to improve operational efficiency; however, WHR system components can take up space within the engine bay and other parts of a vehicle. Moreover, certain WHR system components (e.g., the condenser) expel heat into the ambient air, thereby heating adjacent components. Additionally, modern vehicles typically include increasingly more components, such as additional control systems devices, accessories, exhaust aftertreatment devices, etc. As the engine bay gets more crowded with additional components, airflow—therefore convective heat transfer—is suppressed.

Referring generally to the figures, various embodiments relate to a cooling system for cooling components of a vehicle according to embodiments of the present disclosure. The cooling system is structured to cool both an engine system and a WHR (e.g., ORC WHR) system of the vehicle. The cooling system comprises a WHR condenser positioned along a working fluid circuit of the WHR system. The WHR condenser is also positioned in a vehicle cooling package area so as to receive ram air when the vehicle is in motion. A coolant heat exchanger is positioned along the working fluid circuit downstream of the waste heat recovery condenser. The coolant heat exchanger is also positioned along an engine cooling circuit downstream of the engine. The coolant heat exchanger is structured to transfer heat from engine coolant fluid in the engine cooling circuit to a working fluid in the working fluid circuit. Accordingly, the WHR condenser operates to provide cooling to both the WHR system and the engine system. A remote coolant radiator is positioned along the engine cooling circuit downstream of the engine. The remote coolant radiator may also be positioned outside of the vehicle cooling package area so as to not receive the ram air when the vehicle is in motion.

In some embodiments, the WHR condenser and other heat exchangers, such as an air conditioning condenser, transmission cooler, etc. are integrated as a unitary cooling module. The cooling module is positioned in the vehicle cooling package area so as to receive ram air.

Various embodiments include the WHR condenser positioned in the vehicle cooling package area. The WHR condenser is structured to provide cooling to both the WHR system and to the engine system by removing heat from the working fluid, including heat transferred to the working fluid from the engine coolant fluid via the coolant heat exchanger. In some embodiments, the WHR condenser has greater cooling capacity than conventional WHR condensers so as to provide cooling to both the WHR system and the engine system.

Because the WHR condenser provides cooling to the engine system, and/or because the cooling module is positioned in the vehicle cooling package area so as to receive ram air, various embodiments do not include (e.g., can omit) a coolant radiator in the vehicle cooling package area to remove heat from the engine coolant fluid. Various embodiments include a remote coolant radiator positioned off-engine (e.g., not in the vehicle cooling package area) in an area that does not receive ram air. The cooling capacity of the remote coolant radiator is significantly less than the cooling capacity of conventional radiators. The remote coolant radiator may be operated when needed (e.g., at peak engine power). In some embodiments, the remote coolant radiator is cooled by one or more electric fans during operation.

Various embodiments improve operational efficiency of engine and vehicle systems because the WHR system of the present disclosure captures more waste heat than conventional systems. For example, waste heat that is conventionally rejected to the external environment by the coolant radiator and the charge air cooler is transferred to the working fluid of the WHR system and used to generate useful energy. Additionally, at off-peak conditions, the enlarged WHR condenser provides for fuel economy improvements relative to conventional systems by more fully using the cooling module area that receives ram air. In some embodiments, the remote coolant radiator can be used to extract heat from the coolant as necessary, such as when cooling requirements exceed an extraction capability of the WHR system. Accordingly, various embodiments provide improved fuel economy, easier integration of WHR-capable cooling modules in original equipment manufacturer ("OEM") vehicles, and a faster return on investment for a WHR system.

FIG. 1 is a schematic diagram illustrating a vehicle system 100, according to an embodiment. The vehicle system 100 comprises an engine 102, a vehicle cooling system 104, and a WHR system 106. As will be appreciated, the components of the vehicle system 100 and the arrangement thereof is different than those of conventional vehicle systems. As illustrated in FIG. 1, line 108 defines positioning of components of the vehicle system 100. For example, components to the right of line 108 (as shown in FIG. 1) are positioned on-engine and components to the left of line 108 are positioned off-engine. In some embodiments, on-engine means physically attached to the engine 102, and off-engine means not physically attached to the engine 102. In other embodiments, on-engine means positioned within an engine bay of a vehicle including the vehicle system 100, and off-engine means positioned outside of the engine bay.

As further illustrated in FIG. 1, line 110 also indicates positioning of components of the vehicle system 100. For example, components below the line 110 (as shown in FIG. 1) are positioned in a traditional cooling module area that receives ram air, and components above the line 110 are positioned in an area that does not receive ram air. Ram air is airflow created by a moving object. In this context, ram air is airflow created by movement of a vehicle. For example, the ram air may enter the engine bay (not shown) through the grill due to movement of the vehicle.

The engine 102 may be powered by any of various types of fuels (e.g., diesel, natural gas, gasoline, etc.). In some embodiments, the engine 102 operates as a prime mover for a vehicle. In other embodiments, the engine 102 operates as a prime mover for an electric power generator. In other embodiments, the engine 102 is another type of four-cycle or two-cycle engine. It should be understood that the vehicle system 100 also comprises an intake passage (not shown) fluidly coupled to an intake manifold of the engine 102 and an exhaust passage (not shown) fluidly coupled to an exhaust manifold of the engine 102. The intake passage is structured to transmit charge air to the intake manifold of the engine 102. The exhaust passage is structured to receive exhaust gas from the engine 102 and expel the exhaust gas to the external environment. In some embodiments, the exhaust passage comprises an exhaust gas recirculation passage structured to divert at least a portion of the exhaust gas to the intake manifold of the engine 102. It should be understood that the exhaust passage may also be operatively coupled to one or more aftertreatment components.

The vehicle cooling system 104 is structured to provide cooling for the engine 102 and for other vehicle components. The vehicle cooling system 104 comprises an engine cooling circuit 112 that defines a flow path for coolant fluid flow through the engine 102 and other components of the vehicle cooling system 104. It should be understood that the engine cooling circuit 112 comprises conduits (not shown) fluidly coupling the engine 102 and other components of the vehicle cooling system 104. According to various embodiments, the engine coolant fluid may include a glycol-based coolant, water, or other coolant fluids. In other embodiments, the engine coolant fluid is a thermal oil or other type of heat transfer fluid. The vehicle cooling system 104 also comprises a first pump 114, a thermostat 116, a remote coolant radiator 118, a fan 120, and a coolant heat exchanger 122.

The first pump 114 (e.g., a water pump) is positioned along the engine cooling circuit 112 upstream of the engine 102. It should be understood that the terms "upstream" and "downstream," when referring to the vehicle cooling system 104, refer to the flow direction of the coolant fluid through the vehicle cooling system 104. The first pump 114 is structured to circulate the coolant fluid through the engine cooling circuit 112. A thermostat 116 is positioned along the engine cooling circuit 112 downstream of the engine 102 and is structured to measure the temperature of the coolant fluid exiting the engine 102.

The remote coolant radiator 118 is positioned along the engine cooling circuit 112 downstream of the engine 102 on a first leg 124 of the engine cooling circuit 112. The first leg 124 fluidly couples the first pump 114, the engine 102, the thermostat 116, and the remote coolant radiator 118. In operation, the engine coolant fluid flows through the first leg 124 from the first pump 114, through the engine 102, and subsequently through the remote coolant radiator 118. The fan 120 is positioned proximate the remote coolant radiator 118 and is structured to force air across the remote coolant radiator 118 to facilitate convective heat transfer. In particular, the remote coolant radiator 118 is structured to transfer heat from the hot engine coolant fluid received from the engine 102 to the ambient air. The fan 120 may include one or more fans 120. In some embodiments, the fan 120 is electrically powered. In other embodiments, the fan 120 is belt driven or shaft driven. In the embodiment illustrated in FIG. 1, the remote coolant radiator 118 and the fan 120 are positioned off-engine (to the left of line 108) and in a non-ram air area (above line 110). This arrangement is in contrast with conventional vehicle systems in which the radiator is positioned proximate (e.g., in front of) the engine in a ram air area (e.g., a vehicle cooling package area in the engine bay that receives ram air).

The coolant heat exchanger 122 is positioned along a second leg 126 of the engine cooling circuit 112. The second leg 126 fluidly couples the first pump 114, the engine 102, the thermostat 116, and the coolant heat exchanger 122. In operation, the engine coolant fluid flows through the second leg 126 from the first pump 114 to the engine 102, and subsequently through the coolant heat exchanger 122. The coolant heat exchanger 122 is discussed further below in connection with the WHR system 106.

In some embodiments, a valve 128 is positioned along the engine cooling circuit 112 downstream of the engine 102 and the thermostat 116, and upstream of the remote coolant radiator 118. The valve 128 is structured to selectively block the engine coolant fluid from the first leg 124 so as to divert some or all of the engine coolant fluid to the second leg 126 for cooling by the coolant heat exchanger 122. The valve 128 selectively controls whether the engine coolant fluid flows through both of the first leg 124 and the second leg 126 of the engine cooling circuit 112, or through only the second leg 126. Accordingly, the valve 128 controls an amount of engine coolant fluid that flows through the coolant heat exchanger 122 via the second leg 126 by limiting or blocking flow to the first leg 124. As shown, there is no flow from the first leg 124 through the heat exchanger 122. The valve 128 may control flow through the first and/or second legs 124, 126 based on the temperature of the engine coolant fluid, as determined by a temperature sensor proximate an outlet of the thermostat 116. For example, if the engine coolant fluid reaches a predetermined temperature and requires additional cooling, the valve 128 may allow flow of the engine coolant fluid to the first leg 124 for cooling by the remote coolant radiator 118 in parallel to flow to the coolant heat exchanger 122.

The WHR system 106 is structured to convert waste heat produced by the engine 102 and other components of the vehicle system 100 into useful energy, such as mechanical and/or electrical energy. For example, the WHR system 106 is structured to convert waste heat from the vehicle cooling system 104 to useful energy. In some embodiments, the WHR system 106 is further configured to convert waste heat from other sources, such as charge air, EGR gas, and/or other sources.

The WHR system 106 comprises the coolant heat exchanger 122, a charge air cooler 130, an EGR heat exchanger 132, an expander 134, a condenser 136, and a subcooler 138 positioned along a working fluid circuit 140. The working fluid circuit 140 comprises a second pump 142 (e.g., a feed pump) structured to circulate a working fluid through the various components of the WHR system 106.

The coolant heat exchanger 122 is structured to transfer heat energy from the engine coolant fluid in the engine cooling circuit 112 to the working fluid in the working fluid circuit 140 so as to cool the engine coolant fluid and heat the working fluid. In operation, the engine coolant fluid that passes through the coolant heat exchanger 122 has been heated by the engine 102. Therefore, the coolant heat exchanger 122 cools the engine coolant fluid, thereby providing cooling to the engine 102. According to various embodiments, the working fluid can include any of various types of fluids, such as, for example, a refrigerant (e.g., R245a or other low global warming potential ("GWP") replacements), ethanol, toluene, other hydrocarbon-based working fluids, other hydrofluorocarbon-based working fluids, or water. Because the coolant heat exchanger 122 removes heat from the engine coolant fluid, the coolant heat exchanger 122 performs at least a portion of the cooling operations of a conventional coolant radiator. Thus, in some embodiments, the remote coolant radiator 118 of the vehicle cooling system 104 can be smaller in size (e.g., has less cooling capacity) than a conventional coolant radiator. In addition, the coolant heat exchanger 122 provides for improved efficiency by transferring heat energy from the engine coolant fluid to the working fluid. The WHR system 106 generates useful energy from the heat energy received from the engine coolant fluid of the vehicle cooling system 104. In contrast, this heat energy is discharged to the external environment in conventional systems.

The charge air cooler 130 is positioned along the working fluid circuit 140 downstream of the second pump 142 and upstream of the coolant heat exchanger 122. It should be understood that the terms "upstream" and "downstream," when referring to the working fluid circuit 140, refer to the flow direction of the working fluid through the working fluid circuit 140. The charge air cooler 130 is operatively and fluidly coupled to an intake passage of the engine so as to receive charge air from a compressor of a turbocharger, cool the charge air, and provide the cooled charge air to the intake manifold of the engine 102. The charge air cooler 130 may also receive EGR gas from an exhaust manifold of the engine 102, which may be combined with the charge air from the turbocharger compressor output. The charge air cooler 130 is structured to transfer heat from the charge air to the working fluid in the working fluid circuit 140 so as to cool the charge air and heat the working fluid.

In conventional systems, the charge air cooler is air-cooled or oil-cooled, and heat energy removed by the charge air cooler is discharged to the external environment. In the vehicle system 100 of FIG. 1, however, the charge air cooler 130 is cooled by the working fluid of the WHR system 106. The enlarged capacity of the WHR condenser 136 provides sufficient cooling to cool the charge air cooler 130, whereas conventional WHR condensers may not include such a cooling capacity. Accordingly, the charge air cooler 130 is cooled by the working fluid in the WHR system 106, and heat energy from the charge air cooler 130 is recovered and converted to useful energy by the WHR system 106. Additionally, the charge air cooler 130 need not be positioned in a ram air area of the vehicle system 100, because the charge air cooler 130 is cooled via the working fluid of the WHR system 106 rather than being air-cooled via ram air, as with certain conventional charge air coolers.

The EGR heat exchanger 132 is positioned along the working fluid circuit 140 downstream of the coolant heat exchanger 122 and upstream of the expander 134. The EGR heat exchanger 132 is operatively and fluidly coupled to an EGR passage of the engine so as to receive EGR gas from the exhaust manifold of the engine 102. The EGR heat exchanger 132 is structured to transfer heat from the EGR gas to the working fluid in the working fluid circuit 140 so as to cool the EGR gas and further heat the working fluid. The cooled EGR gas is then transferred to the intake manifold of the engine 102. In some implementations, the cooled EGR gas is first combined with the charge air from the turbocharger compressor outlet and transferred through the charge air cooler 130 before being transferred to the intake manifold of the engine 102. As the working fluid is heated by each of the charge air cooler 130, the coolant heat exchanger 122, and the EGR heat exchanger 132, the working fluid can be heated sufficiently so that the working fluid is in a substantially vapor form prior to reaching the expander 134.

The expander 134 is positioned along the working fluid circuit 140 downstream of the EGR heat exchanger 132 and upstream of the condenser 136. As the substantially vaporized working fluid travels through the expander 134, the vapor expands and loses pressure, thereby driving a turbine of the expander 134 to generate useful work. In some embodiments, the turbine of the expander 134 is operatively coupled to a generator, which can convert the mechanical energy of the rotating turbine into electrical energy. In other embodiments, the turbine of the expander 134 is operatively coupled to a crankshaft of the engine 102, an engine accessory shaft, and/or other components, for example, via a gear or belt drive so as to transfer mechanical energy to those devices. According to various embodiments, the expander 134 may include a piston expander, a screw expander, a scroll expander, a gerotor expander, or other type of expander.

The condenser 136 is positioned along the working fluid circuit 140 downstream of the expander 134. The condenser is structured to receive the working fluid from the expander 134 and to transfer heat from the working fluid to the ambient environment, thereby substantially or fully condensing the working fluid back to a liquid. As mentioned above, the condenser 136 has greater cooling capacity than conventional WHR condensers so as to provide cooling to both the WHR system 106 and the vehicle cooling system 104, including the charge air cooler 130 and the EGR heat exchanger 132. The condenser 136 is at least partially air-cooled. The condenser 136 is positioned off-engine in a vehicle cooling package area structured to receive ram air.

The subcooler 138 is positioned along the working fluid circuit 140 downstream of the condenser 136. The subcooler 138 is structured to receive the working fluid from the condenser 136 and to transfer heat from the working fluid to the ambient environment, thereby further cooling the working fluid, which is substantially in liquid form at this stage. The working fluid is then transferred from the subcooler 138 to the second pump 142, and is cycled again through the working fluid circuit 140. Although the condenser 136 is described as having greater cooling capacity (e.g., being oversized) relative to conventional condensers, it should be understood that, according to various embodiments, one or both of the condenser 136 and the subcooler 138 have a greater cooling capacity relative to conventional condensers and subcoolers.

Figure 2:
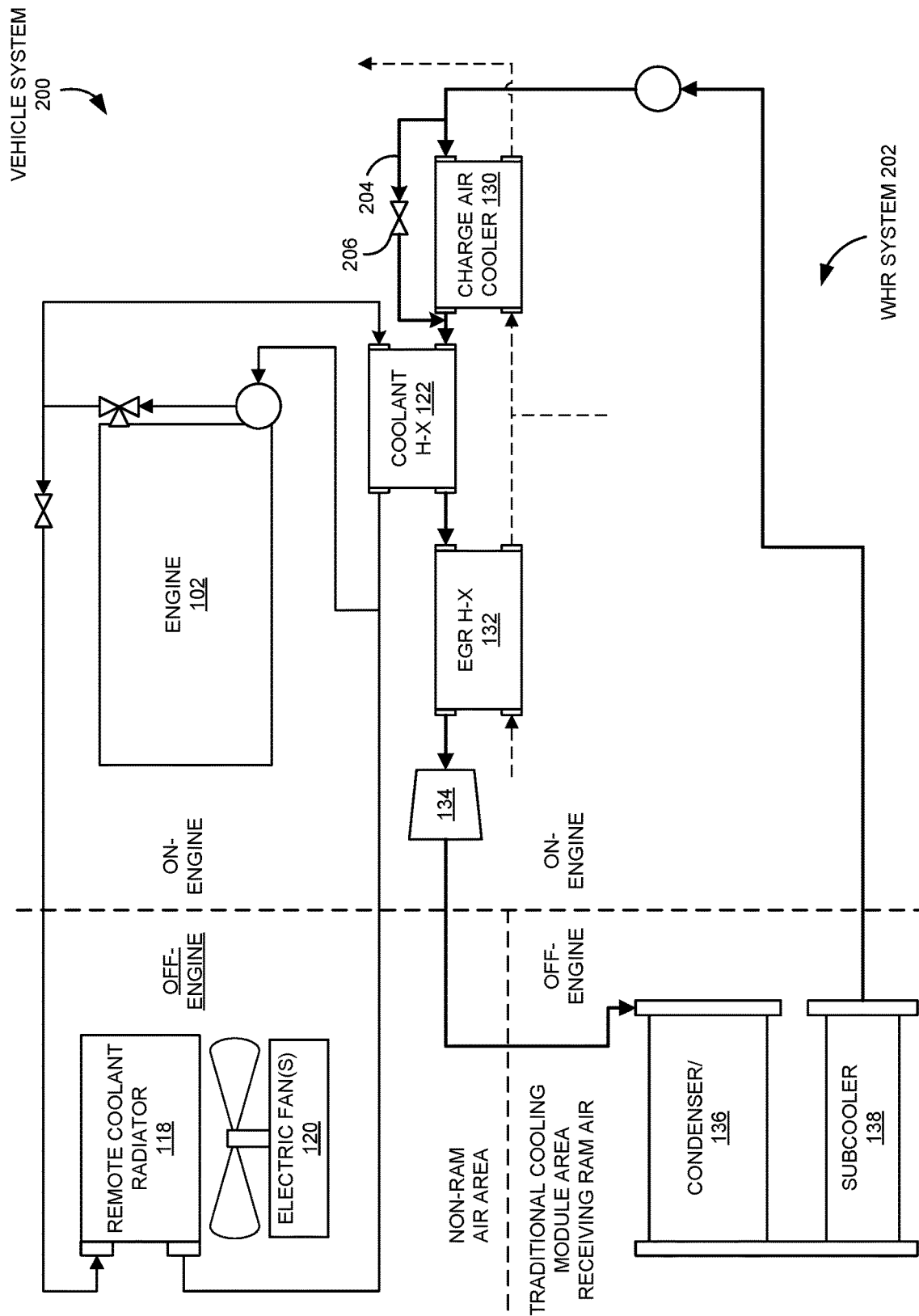
FIG. 2 is a schematic diagram illustrating a vehicle system including a charge air cooler bypass, according to an example embodiment.

FIG. 2 is a schematic diagram illustrating a vehicle system 200 according to another embodiment. The vehicle system 200 of FIG. 2 is generally similar to the vehicle system 100 of FIG. 1, a difference being that a WHR system 202 comprises a charge air cooler bypass line 204 extending from an inlet upstream of the charge air cooler 130 to an outlet downstream of the charge air cooler 130 and upstream of the coolant heat exchanger 122. A charge air cooler bypass valve 206 is operatively coupled to the charge air cooler bypass line 204 so as to control flow of the working fluid through the charge air cooler bypass line 204, thereby controllably bypassing the working fluid around the charge air cooler 130. For example, in an embodiment, the charge air cooler bypass valve 206 is opened to control flow of a portion of or all of the working fluid through the charge air cooler bypass line 204 instead of through the charge air cooler 130, so as to provide a capability for regulation of the temperature of at least one of the charge air, the working fluid, and the engine coolant fluid.

Figure 3:
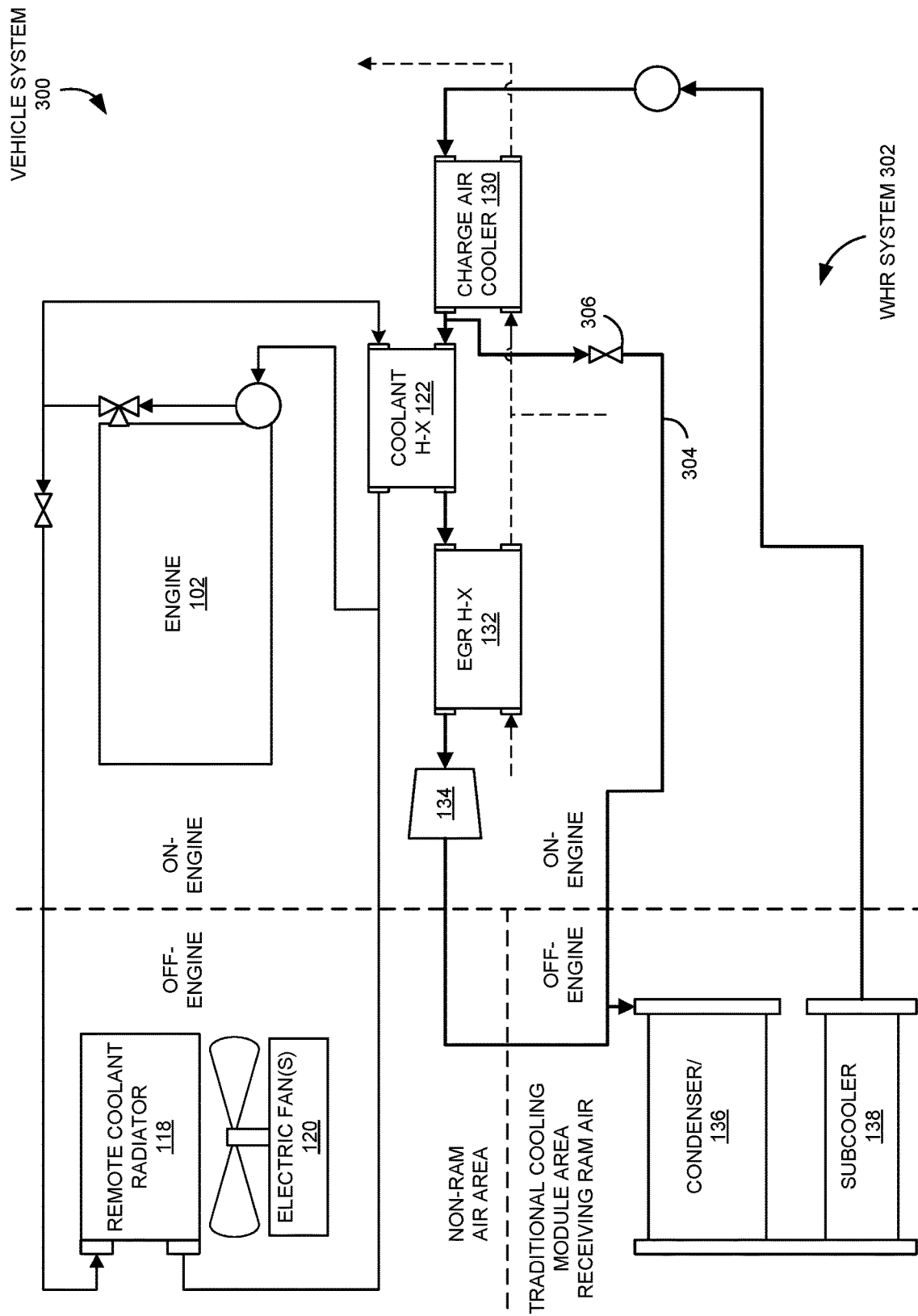
FIG. 3 is a schematic diagram illustrating a vehicle system including an expander bypass downstream of a charge air cooler, according to an example embodiment.

FIG. 3 is a schematic diagram illustrating a vehicle system 300 according to another embodiment. The vehicle system 300 of FIG. 3 is generally similar to the vehicle system 100 of FIG. 1, a difference being that a WHR system 302 comprises an expander bypass line 304 extending from an inlet downstream of the charge air cooler 130 to an outlet upstream of the condenser 136. An expander bypass valve 306 is operatively coupled to the expander bypass line 304 so as to control flow of the working fluid through the expander bypass line 304, thereby controllably bypassing the working fluid around the coolant heat exchanger 122, the EGR heat exchanger 132, and the expander 134. For example, in an embodiment, the expander bypass valve 306 is opened so as to control flow of a portion of or all of the working fluid through the expander bypass line 304 instead of through the coolant heat exchanger 122, so as to provide a capability for regulation of the temperature of at least one of the working fluid and the engine coolant fluid. For example, in operation, working fluid may be transmitted through the expander bypass line 304 to bypass flow through the coolant heat exchanger 122 if heat rejection available from the engine coolant fluid in the coolant heat exchanger 122 and the EGR gas in the EGR heat exchanger 132 are not sufficient to fully vaporize the working fluid exiting the charge air cooler 130. In some embodiments, this is indicated by the temperature of the engine coolant fluid being below a threshold temperature, thereby indicating that further cooling is not required.

Figure 4:
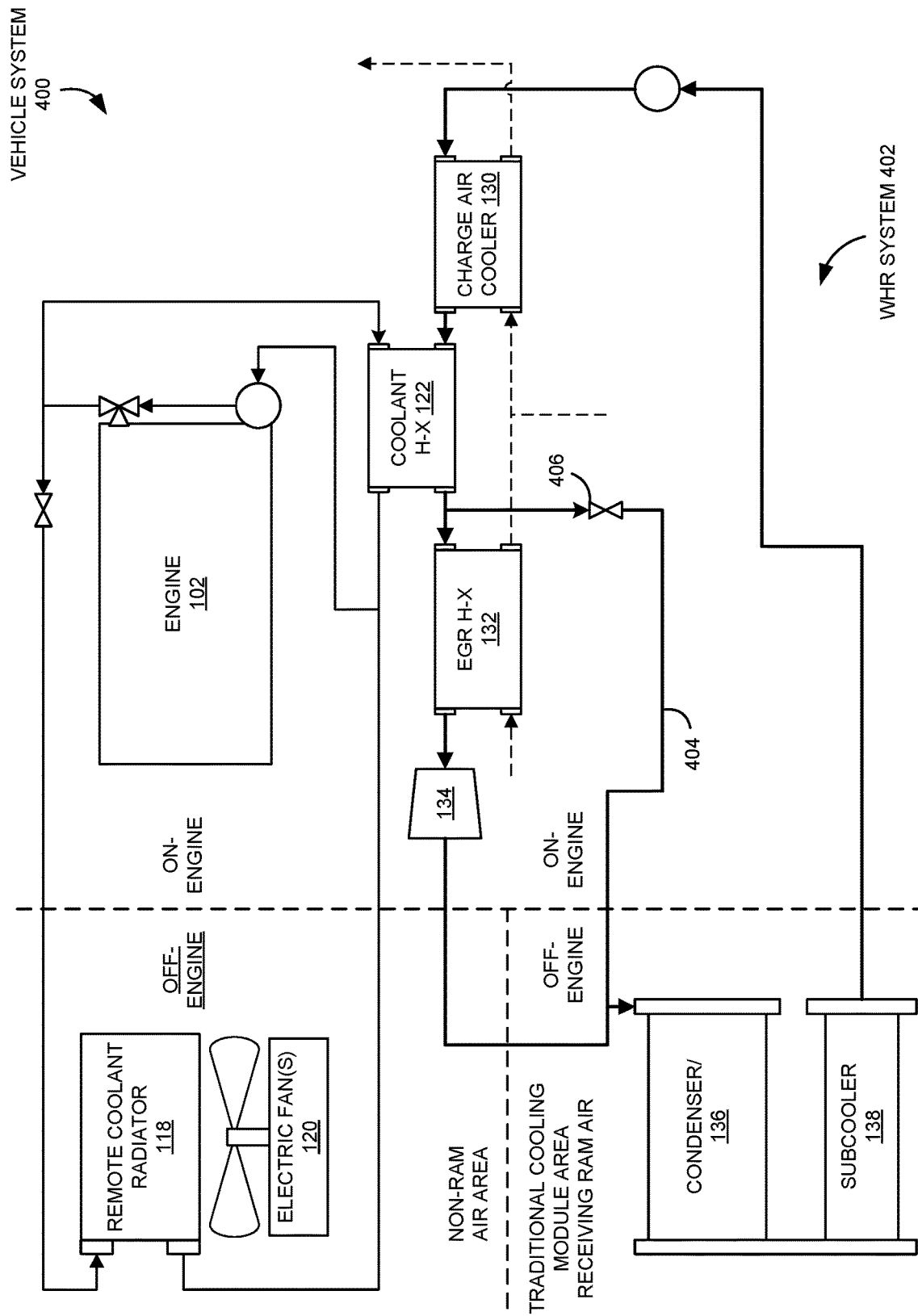
FIG. 4 is a schematic diagram illustrating a vehicle system including an expander bypass downstream of a coolant heat exchanger, according to an example embodiment.

FIG. 4 is a schematic diagram illustrating a vehicle system 400 according to another embodiment. The vehicle system 400 of FIG. 4 is generally similar to the vehicle system 300 of FIG. 3, a difference being that a WHR system 402 comprises an expander bypass line 404 extending from an inlet downstream of the coolant heat exchanger 122 and upstream of the EGR heat exchanger 132 to an outlet upstream of the condenser 136. An expander bypass valve 406 is operatively coupled to the expander bypass line 404 so as to control flow of the working fluid through the expander bypass line 404, thereby controllably bypassing the working fluid around the EGR heat exchanger 132 and the expander 134. For example, in an embodiment, the expander bypass valve 406 is opened so as to control flow of a portion of or all of the working fluid through the expander bypass line 404 instead of through the EGR heat exchanger 132, so as to provide a capability for regulation of the temperature of at least one of the EGR gas, the working fluid, and the engine coolant fluid. For example, working fluid may be bypassed from flowing through the EGR heat exchanger 132 if heat rejection available from the EGR gas in the EGR heat exchanger 132 is not sufficient to fully vaporize the working fluid exiting the coolant heat exchanger 122. In some embodiments, this is indicated by the temperature of the EGR gas being below a threshold temperature, thereby indicating that further cooling is not required.

Figure 5:
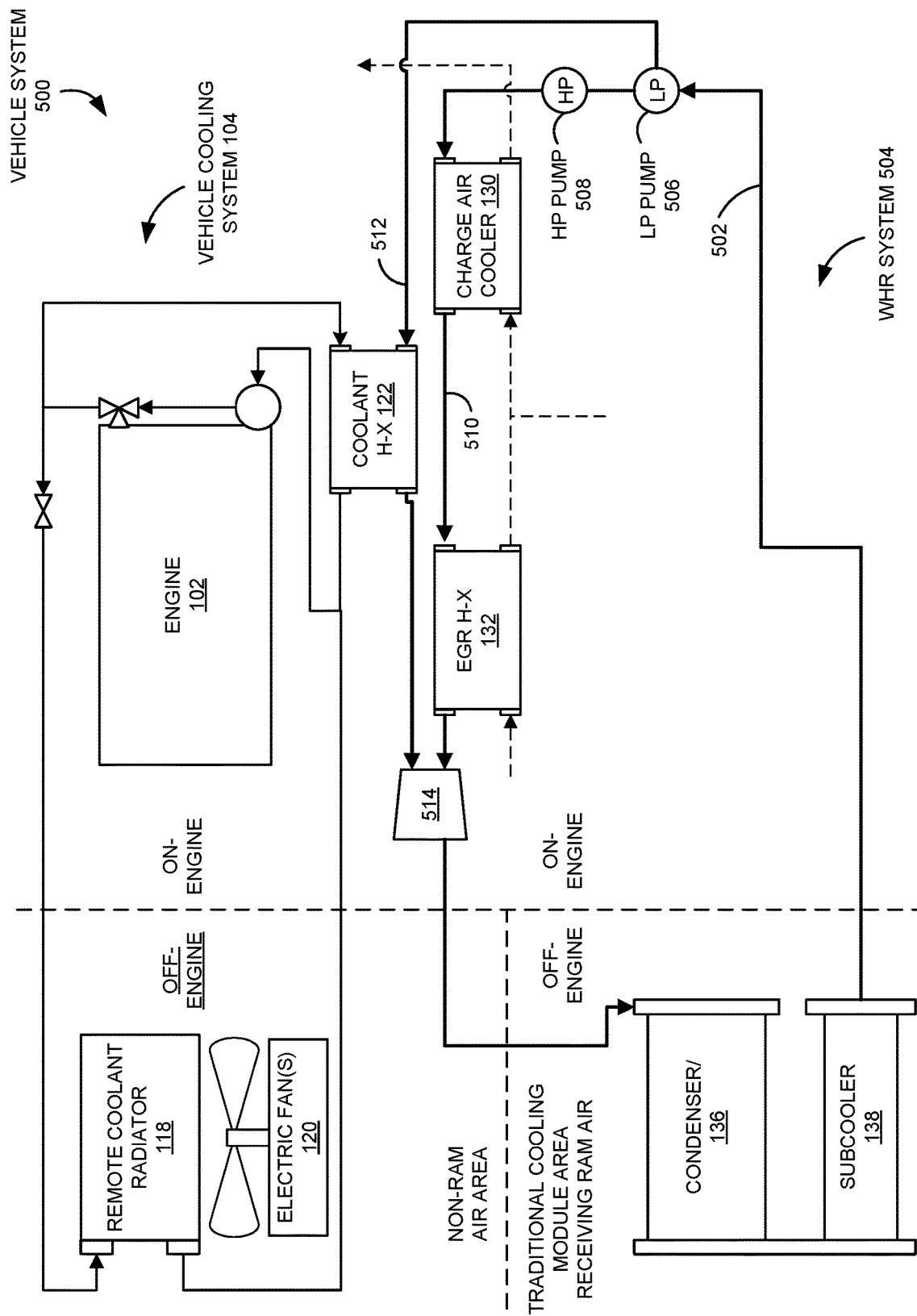
FIG. 5 is a schematic diagram illustrating a vehicle system including dual WHR feed pumps, according to an example embodiment.

FIG. 5 is a schematic diagram illustrating a vehicle system 500 according to another embodiment. The vehicle system 500 of FIG. 5 is generally similar to the vehicle system 100 of FIG. 1, a difference being that a working fluid circuit 502 of a WHR system 504 comprises dual feed pumps, specifically, a low pressure pump 506 and a high pressure pump 508 positioned downstream of the low pressure pump 506. Accordingly, the working fluid that is directed through the high pressure line 510 is pressurized by both the low pressure pump 506 and by the high pressure pump 508. A high pressure line 510 fluidly couples the low pressure pump 506, the high pressure pump 508, the charge air cooler 130, the EGR heat exchanger 132, and an expander 514. A low pressure line 512 fluidly couples the low pressure pump 506, the coolant heat exchanger 122, and the expander 514. Accordingly, the working fluid that is directed through the low pressure line 512 is pressurized by the low pressure pump 506, but not by the high pressure pump 508. The expander 514 receives two working fluid inputs, namely, from each of the high pressure line 510 and the low pressure line 512. In one embodiment, the expander 514 is a dual entry expander, with each entry (e.g., inlet) being fluidly coupled to a respective one of the high pressure line 510 and the low pressure line 512. In another embodiment, the expander 514 comprises twin expanders, with each expander being fluidly coupled to a respective one of the high pressure line 510 and the low pressure line 512. The working fluid flows from the expander 514 to the condenser 136 in a manner similar to that described above in connection with the WHR system 106 of FIG. 1.

By having separate high and low pressure lines 510, 512, respectively, the WHR system 504 of FIG. 5 may be controlled to a greater extent than the WHR system 106 of FIG. 1. For example, the low pressure pump 506 and the high pressure pump 508 may be controlled independently so as to controllably adjust fluid flow through the coolant heat exchanger 122, separately from controllably adjusting fluid flow through the charge air cooler 130 and the EGR heat exchanger 132. For example, in some situations, EGR may be deactivated. Accordingly, in such situations, the low pressure pump 506 and/or a control valve positioned downstream of the low pressure pump 506 and upstream of the high pressure pump 508 may be controlled so that the working fluid in the working fluid circuit 502 is directed through the coolant heat exchanger 122 via the low pressure line 512 and not through the high pressure line 510.

Figure 6:
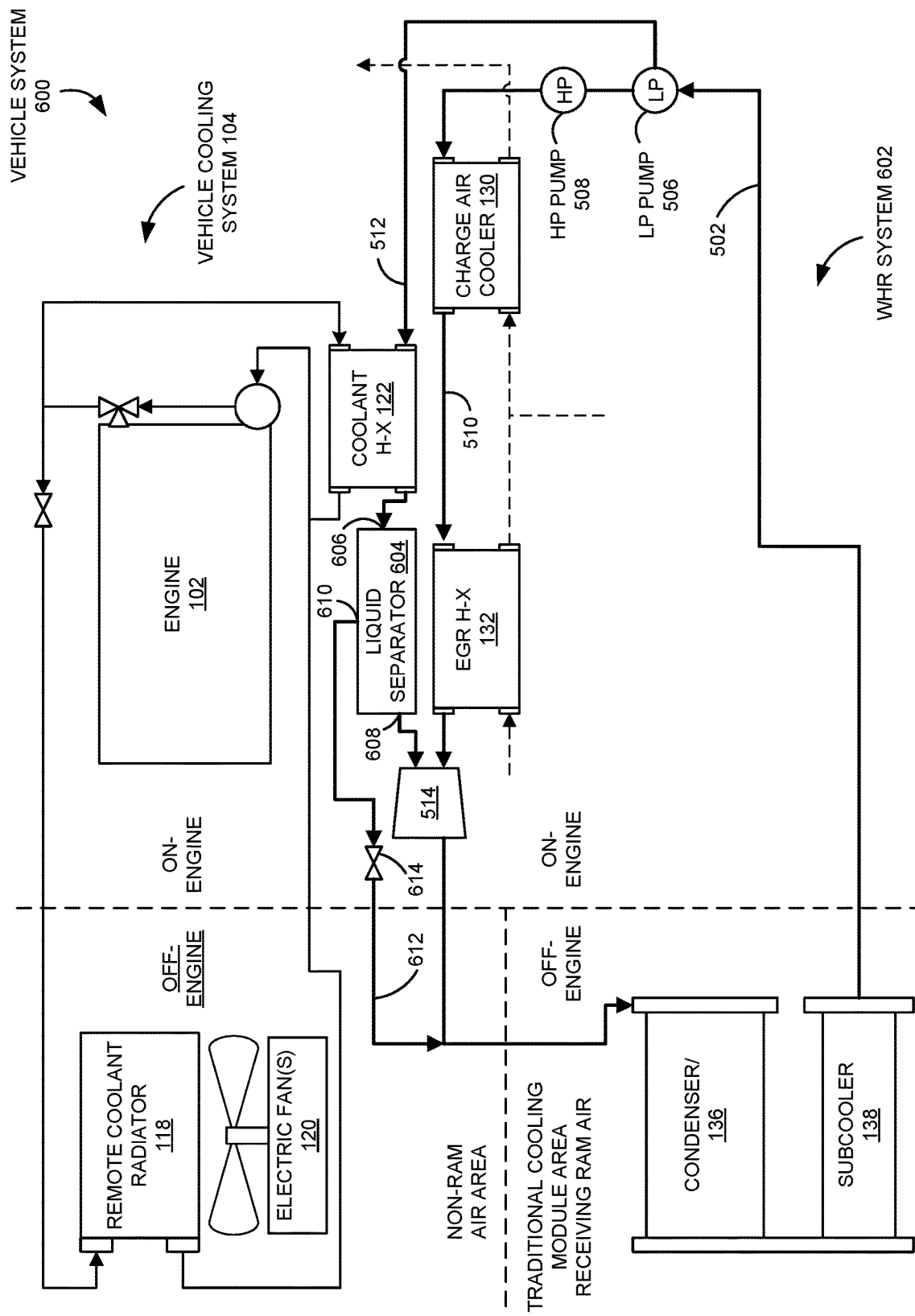
FIG. 6 is a schematic diagram illustrating a vehicle system including dual WHR feed pumps and a liquid separator, according to an example embodiment.

FIG. 6 is a schematic diagram illustrating a vehicle system 600 according to another embodiment. The vehicle system 600 of FIG. 6 is generally similar to the vehicle system 500 of FIG. 5, a difference being that a WHR system 602 comprises a liquid separator 604 fluidly and operatively coupled to the low pressure line 512. The liquid separator 604 is positioned downstream of the coolant heat exchanger 122 and upstream of the expander 514. The liquid separator 604 includes an inlet 606, a first outlet 608, and a second outlet 610. Working fluid, which may include both liquid and gas phases of the working fluid, is received via the inlet 606. The liquid separator 604 is structured to separate the liquid phase of the working fluid from the gaseous phase of the working fluid. The liquid separator 604 transmits the gaseous phase via the first outlet 608 and the liquid phase via the second outlet 610. The WHR system 602 also comprises an expander bypass line 612 extending from the second outlet 610 of the liquid separator 604 to an inlet of the condenser 136. In an embodiment, the liquid phase of the working fluid is transmitted through the expander bypass line 612 directly to the condenser 136, and the gaseous phase of the working fluid is transmitted through the low pressure line 512 to the expander 514 and subsequently to the condenser 136. An expander bypass valve 614 is operatively coupled to the expander bypass line 612 so as to control flow of some or all of the working fluid through the expander bypass line 612, thereby controllably bypassing the liquid phase of the working fluid from the liquid separator 604 around the expander 514.

Figure 7:
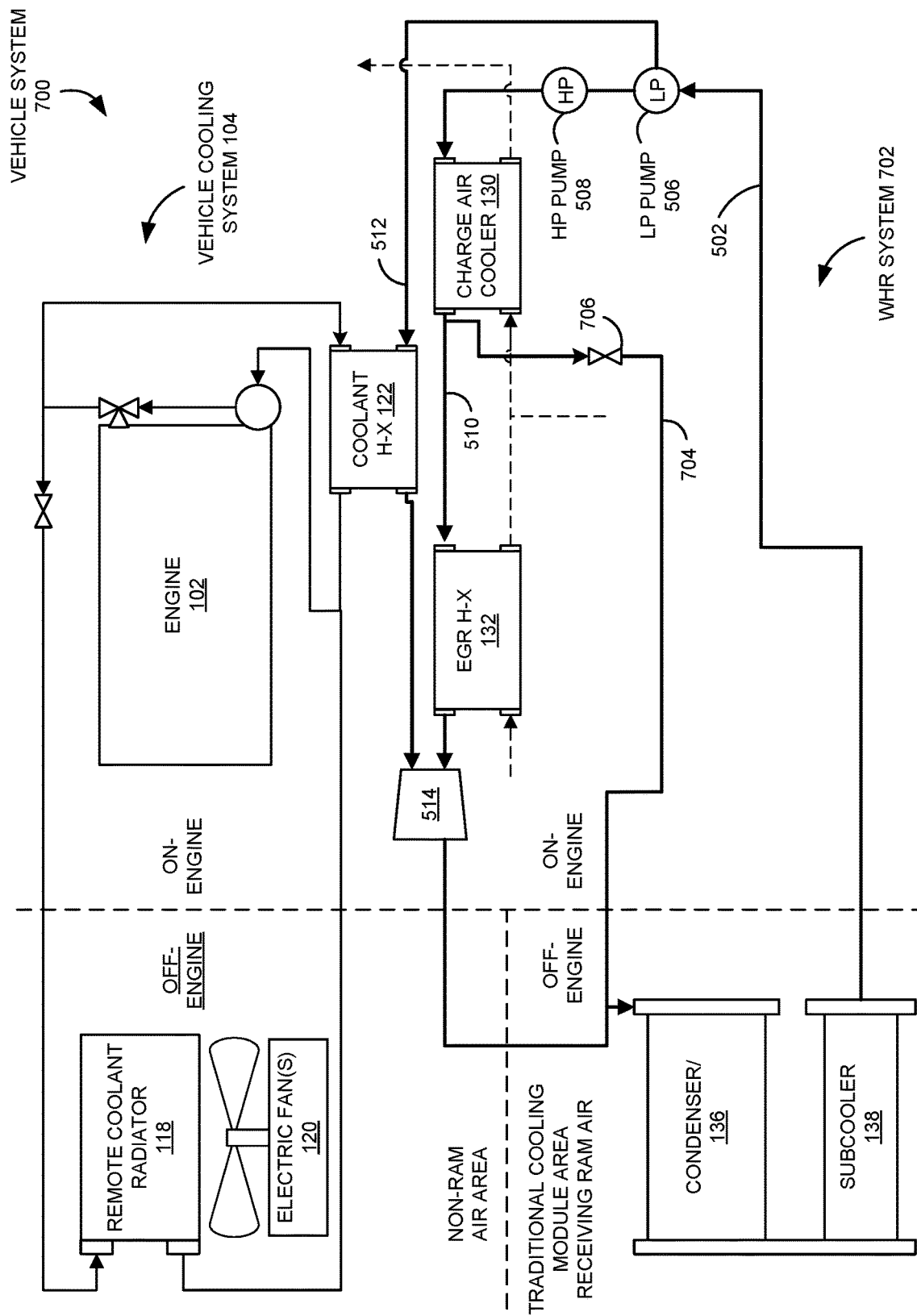
FIG. 7 is a schematic diagram illustrating a vehicle system including dual WHR feed pumps and an expander bypass, according to an example embodiment.

FIG. 7 is a schematic diagram illustrating a vehicle system 700 according to another embodiment. The vehicle system 700 of FIG. 7 is generally similar to the vehicle system 500 of FIG. 5, a difference being that a WHR system 702 comprises an expander bypass line 704 comprising an inlet fluidly coupled to the high pressure line 510 downstream of the charge air cooler 130 to an outlet fluidly coupled to the high pressure line 510 upstream of the condenser 136. An expander bypass valve 706 is operatively coupled to the expander bypass line 704 so as to control flow of the working fluid through the expander bypass line 704, thereby controllably bypassing the working fluid in the high pressure line 510 around the EGR heat exchanger 132 and the expander 514. For example, in an embodiment, the expander bypass valve 706 is opened so as to control flow of a portion of or all of the working fluid through the expander bypass line 704 instead of through the EGR heat exchanger 132 so as to provide a capability for regulation of the temperature of at least one of the working fluid and the EGR gas. For example, in operation, working fluid may be transmitted through the expander bypass line 704 so as to bypass flow through the EGR heat exchanger 132 if heat rejection available from the EGR gas in the EGR heat exchanger 132 is not sufficient to fully vaporize the working fluid exiting the charge air cooler 130. In some embodiments, this is indicated by the temperature of the EGR gas being below a threshold temperature, thereby indicating that further cooling is not required.

Figure 8:
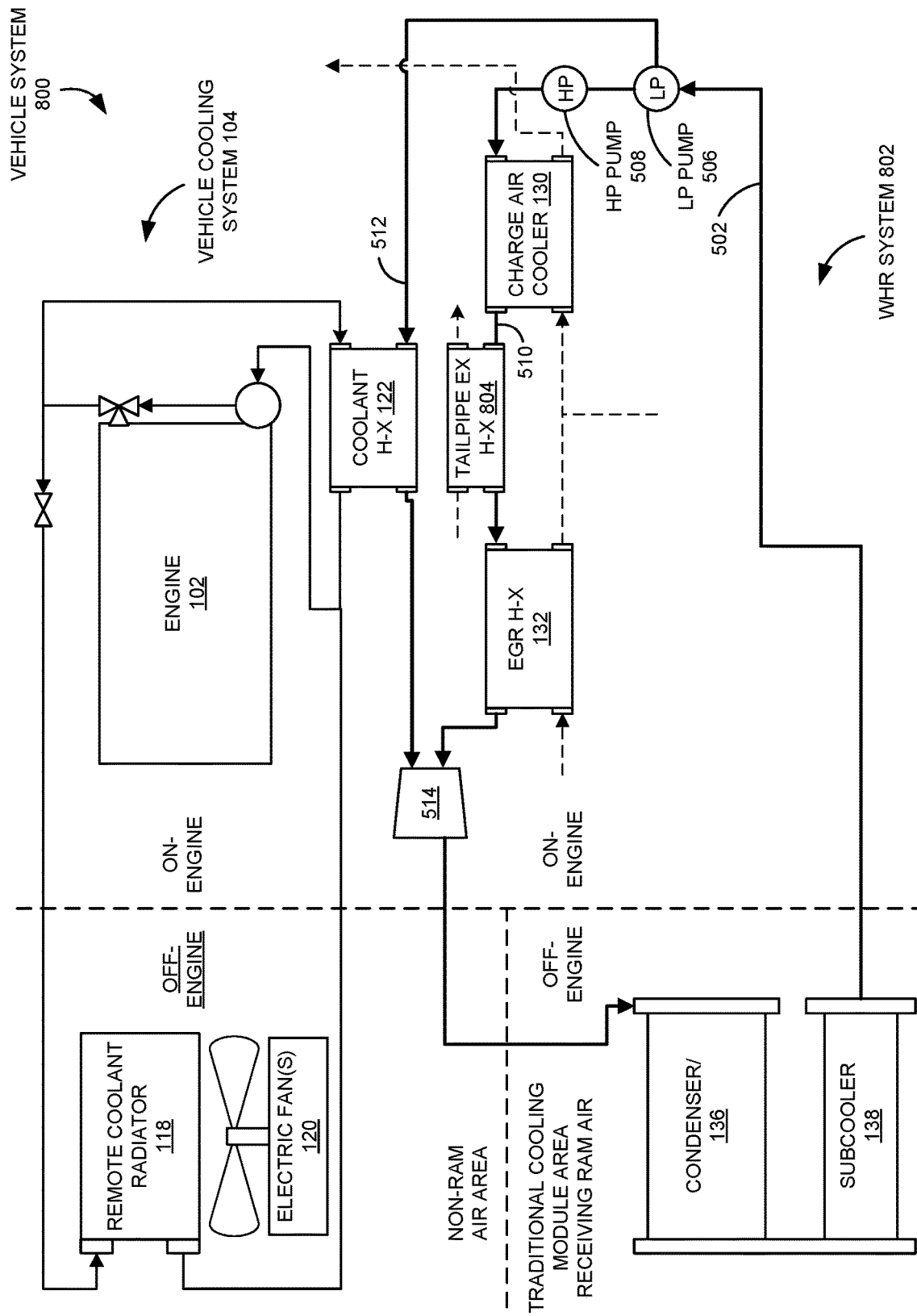
FIG. 8 is a schematic diagram illustrating a vehicle system including dual WHR feed pumps and a tailpipe exhaust heat exchanger, according to an example embodiment.

FIG. 8 is a schematic diagram illustrating a vehicle system 800 according to another embodiment. The vehicle system 800 of FIG. 8 is generally similar to the vehicle system 500 of FIG. 5, a difference being that a WHR system 802 comprises a tailpipe exhaust heat exchanger 804 operatively and fluidly coupled to the high pressure line 510 downstream of the charge air cooler 130 and upstream of the EGR heat exchanger 132. The tailpipe exhaust heat exchanger 804 is operatively and fluidly coupled to an exhaust passage (e.g., tailpipe) so as to receive hot exhaust gas from the exhaust manifold of the engine 102. The tailpipe exhaust heat exchanger 804 is structured to transfer heat from the exhaust gas to the working fluid so as to cool the exhaust gas and further heat the working fluid. The cooled exhaust gas is then transferred to the intake manifold of the engine 102. Accordingly, heat energy from the exhaust is recovered by the tailpipe exhaust heat exchanger 804 and converted to useful energy by the WHR system 802, thereby further improving operational efficiency.

Figure 9:
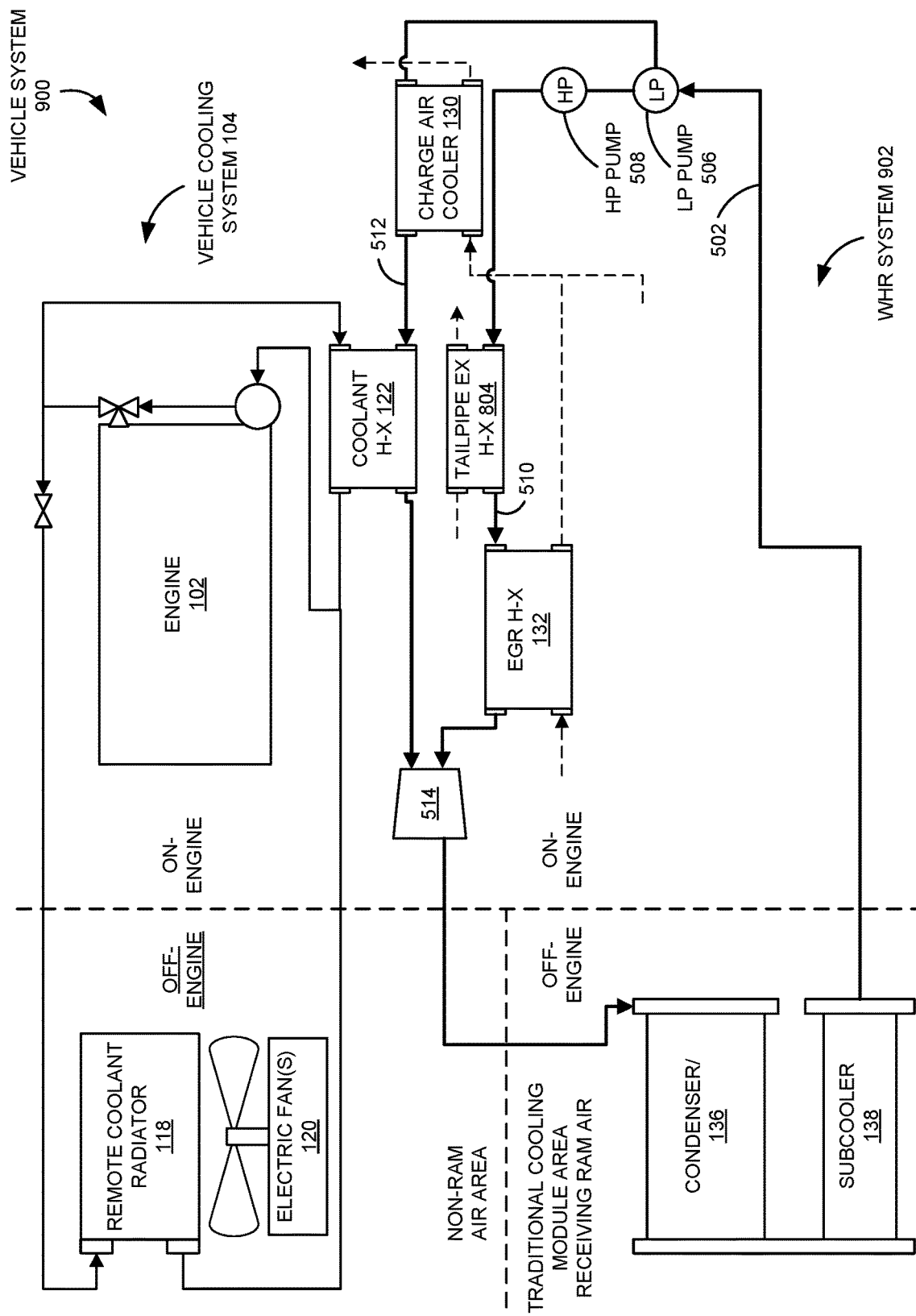
FIG. 9 is a schematic diagram illustrating a vehicle system including dual WHR feed pumps, according to another example embodiment.

FIG. 9 is a schematic diagram illustrating a vehicle system 900 according to another embodiment. The vehicle system 900 of FIG. 9 is generally similar to the vehicle system 800 of FIG. 8, a difference being that a WHR system 902 includes the charge air cooler 130 operatively and fluidly coupled to the low pressure line 512 upstream of the coolant heat exchanger 122. In contrast, in the WHR system 802 of FIG. 8, the charge air cooler 130 is operatively and fluidly coupled to the high pressure line 510. By including the charge air cooler 130 in the low pressure line 512 rather than the high pressure line 510, the amount of heat transferred to each of the high pressure line 510 and the low pressure line 512 is balanced in the WHR system 902 relative to the WHR system 802.

Figure 10:
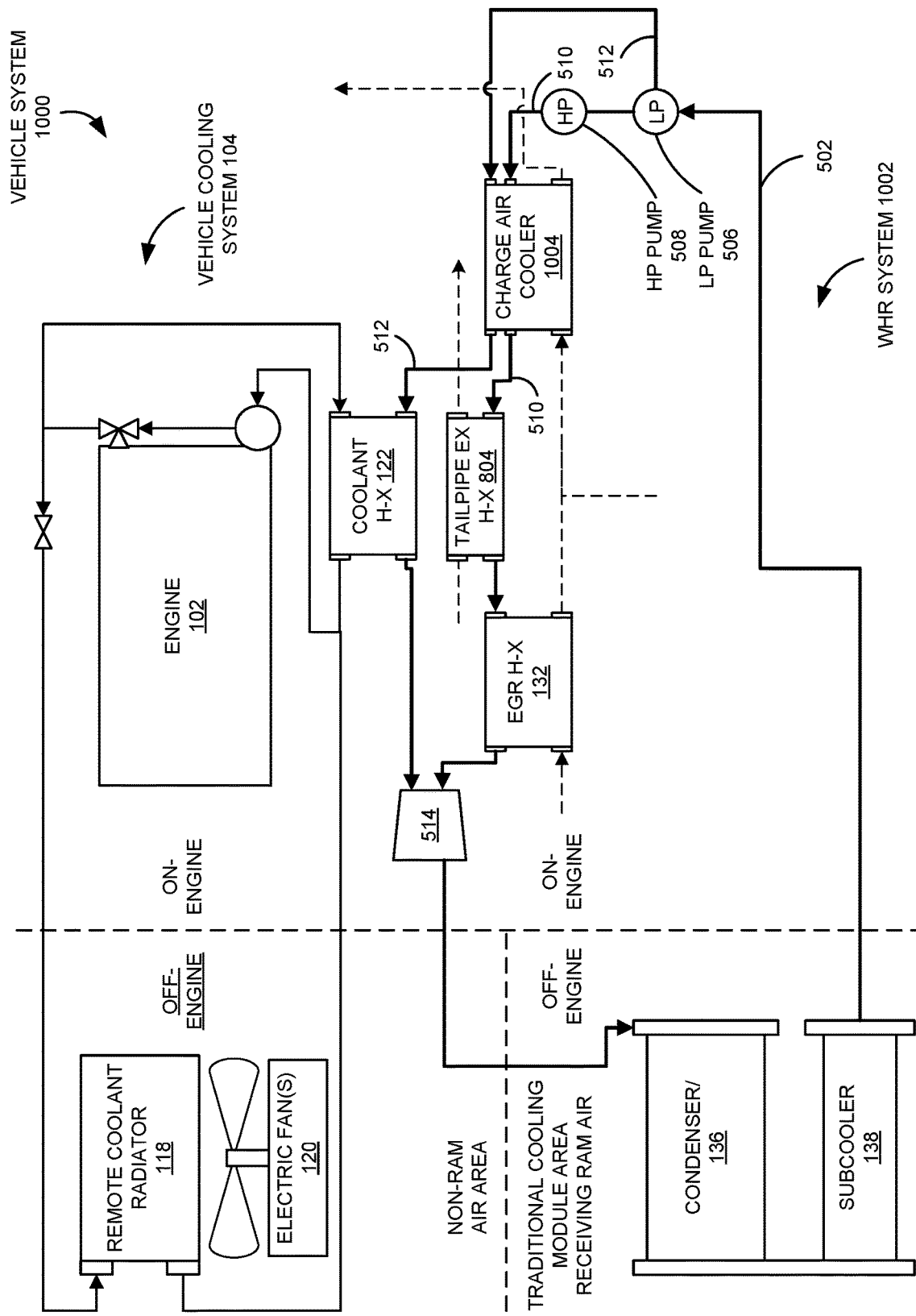
FIG. 10 is a schematic diagram illustrating a vehicle system including a charge air cooler operatively coupled to each of high pressure and low pressure working fluid lines, according to another example embodiment.

FIG. 10 is a schematic diagram illustrating a vehicle system 1000, according to another embodiment. The vehicle system of FIG. 10 is generally similar to the vehicle system 800 of FIG. 8 and the vehicle system 900 of FIG. 9, a difference being that a WHR system 1002 includes a charge air cooler 1004 operatively and fluidly coupled to each of the high pressure line 510 and the low pressure line 512. In contrast, the WHR system 802 of FIG. 8 includes the charge air cooler 130 operatively and fluidly coupled to only the high pressure line 510. Additionally, in contrast to the vehicle system 1000, the WHR system 902 of FIG. 9 includes the charge air cooler 130 operatively and fluidly coupled to only the low pressure line 512. For the purposes of clarity, the high pressure line 510 and the low pressure line of FIG. 10 are labeled both upstream and downstream of the charge air cooler 1004. It should be understood that the configuration of the charge air cooler 1004 of FIG. 10 can be implemented in a similar manner in the WHR systems 504 and 602 of FIGS. 5 and 6.

The charge air cooler 1004 of FIG. 10 is different than the charge air cooler 130 of FIGS. 1-9. In particular, the charge air cooler 1004 of FIG. 10 includes two working fluid (cold) passages in a combined core. A first working fluid passage of the charge air cooler 1004 is fluidly coupled to the high pressure line 510, and a second working fluid passage of the charge air cooler 1004 is fluidly coupled to the low pressure line 512. More specifically, the first working fluid passage of the charge air cooler 1004 includes a first inlet fluidly coupled to the high pressure pump 508 via the high pressure line 510, and a first outlet fluidly coupled to the expander 514 via the high pressure line 510. The second working fluid passage of the charge air cooler 1004 includes a second inlet fluidly coupled to the low pressure pump 506 via the low pressure line 512, and a second outlet fluidly coupled to the coolant heat exchanger 122 via the low pressure line 512. The charge air flowing through a charge air (hot) passage of the charge air cooler 1004 is cooled by both the high pressure working fluid from the high pressure line 510 and the low pressure fluid from the low pressure line 512. It should be noted that the charge air cooler 1004 includes two working fluid passages because the working fluid in the high pressure line 510 is a different pressure than the working fluid in the low pressure line 512.

Figure 11:
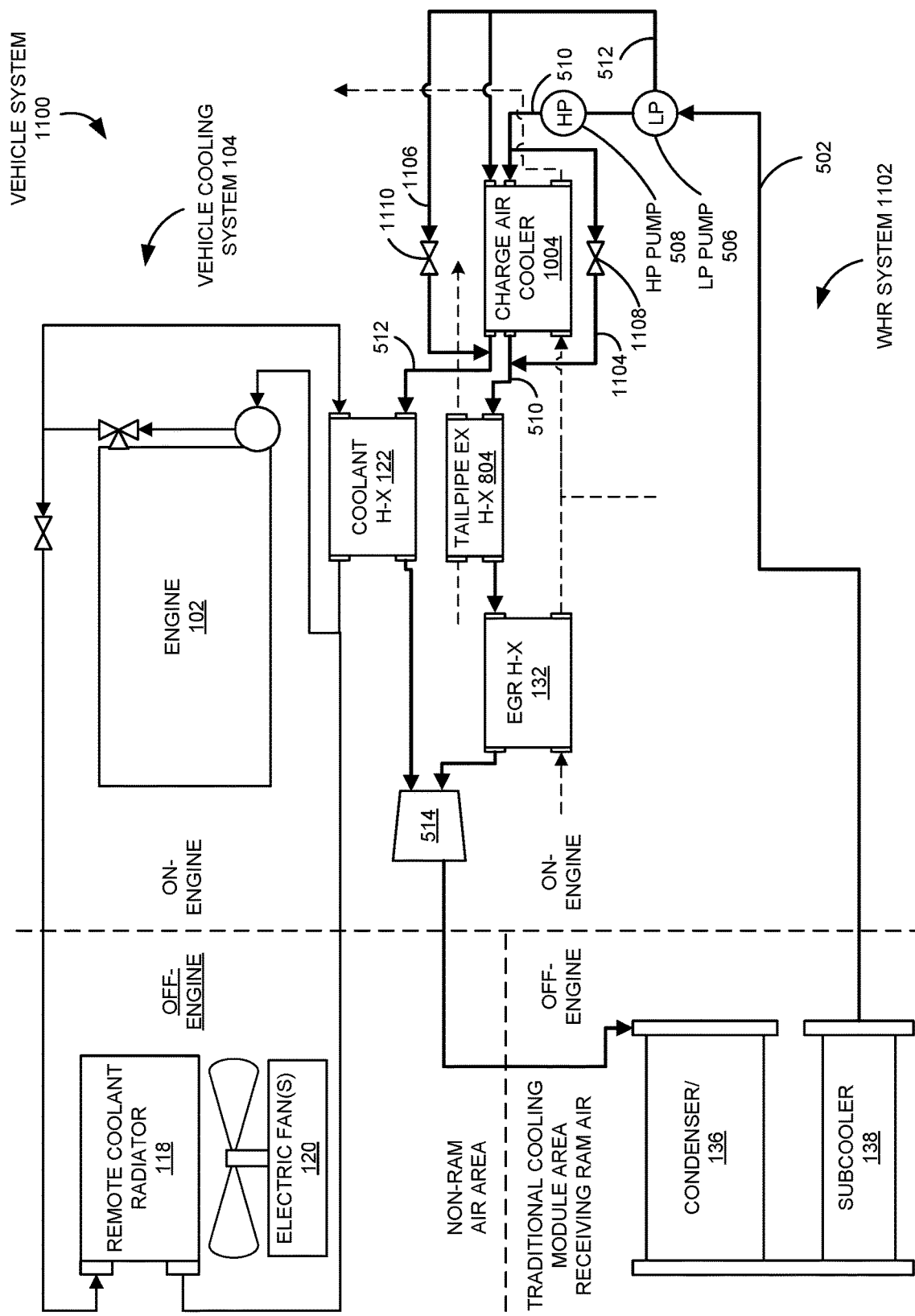
FIG. 11 is a schematic diagram illustrating a vehicle system including high pressure and low pressure charge air cooler bypass lines, according to another example embodiment.

FIG. 11 is a schematic diagram illustrating a vehicle system 1100, according to still another embodiment. The vehicle system of FIG. 11 is generally similar to the vehicle system 1000 of FIG. 10, a difference being that a WHR system 1102 includes a high pressure charge air cooler bypass line 1104 and a low pressure charge air cooler bypass line 1106. The high pressure charge air cooler bypass line 1104 comprises an inlet fluidly coupled to the high pressure line 510 upstream of the charge air cooler 1004 and downstream of the high pressure pump 508, and an outlet fluidly coupled to the high pressure line 510 downstream of the charge air cooler 1004 and upstream of the tailpipe exhaust heat exchanger 804.

A high pressure charge air cooler bypass valve 1108 is operatively coupled to the high pressure charge air cooler bypass line 1104 so as to control flow of the working fluid through the high pressure charge air cooler bypass line 1104, thereby controllably bypassing the working fluid in the high pressure line 510 around the charge air cooler 1004. For example, in an embodiment, the high pressure charge air cooler bypass valve 1108 is opened to control flow of a portion of or all of the working fluid through the high pressure charge air cooler bypass line 1104 instead of through the charge air cooler 1004, so as to provide a capability for regulation of the temperature of at least one of the charge air, the working fluid, and the tailpipe exhaust gas.

The low pressure charge air cooler bypass line 1106 comprises an inlet fluidly coupled to the low pressure line 512 upstream of the charge air cooler 1004 and downstream of the low pressure pump 506, and an outlet fluidly coupled to the low pressure line 512 downstream of the charge air cooler 1004 and upstream of the coolant heat exchanger 122.

A low pressure charge air cooler bypass valve 1110 is operatively coupled to the low pressure charge air cooler bypass line 1106 so as to control flow of the working fluid through the low pressure charge air cooler bypass line 1106, thereby controllably bypassing the working fluid in the low pressure line 512 around the charge air cooler 1004. For example, in an embodiment, the low pressure charge air cooler bypass valve 1110 is opened to control flow of a portion of or all of the working fluid through the low pressure charge air cooler bypass line 1106 instead of through the charge air cooler 1004, so as to provide a capability for regulation of the temperature of at least one of the charge air, the working fluid, and the engine coolant.

It should be appreciated that, in some embodiments, the WHR system 1102 includes only one of the high pressure charge air cooler bypass line 1104 and the low pressure charge air cooler bypass line 1106. It should also be appreciated that, according to various embodiments, the high pressure charge air cooler bypass line 1104 and/or the low pressure charge air cooler bypass line 1106 may be implemented in any of the WHR systems 502, 602, 702, 802, 902, and 1002 of FIGS. 5, 6, 7, 8, 9, and 10.

It should also be appreciated that any of the valves described herein, including the valve 128, the charge air cooler bypass valve 206, the expander bypass valve 306, the expander bypass valve 406, the expander bypass valve 608, the expander bypass valve 706, the high pressure charge air cooler bypass valve 1108, and the low pressure charge air cooler bypass valve 1110 may be actively or passively controlled. For example, any of the valves may be electronically controlled by an electronic controller operatively and communicatively coupled to the valves. Any of the valves may be controlled based on various measured conditions, such as working fluid temperature, engine coolant temperature, working fluid pressure, charge air temperature, engine load, and other measured conditions. Any of the valves may also be controlled by a mechanical actuator, which may be actuated, for example, based on temperature or pressure.

As will be appreciated to those of ordinary skill in the art, in embodiments including an electronic controller, the controller includes operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or pulse width modulation (PWM) signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

While the present disclosure contains specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The terms "coupled" and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. When the language "at least a portion" and/or "a portion" is used the item can include a portion and/or the entire item unless specifically stated to the contrary.

What is claimed is:

1. A system, comprising:
   an engine cooling system, comprising:
     an engine cooling circuit comprising a first pump structured to circulate an engine coolant fluid through the engine cooling circuit,
     a remote coolant radiator positioned along the engine cooling circuit downstream of an engine and positioned outside of a vehicle cooling package area, the remote coolant radiator structured to transfer heat from the engine coolant fluid to air flowing through the remote coolant radiator, and
     a coolant heat exchanger positioned along the engine cooling circuit in parallel to the remote coolant radiator and upstream of the engine; and
   a waste heat recovery system, comprising:
     a working fluid circuit comprising a second pump structured to circulate a working fluid through the working fluid circuit,
     the coolant heat exchanger positioned along the working fluid circuit and structured to transfer heat from the engine coolant fluid to the working fluid,
     an expander positioned along the working fluid circuit downstream of the coolant heat exchanger, the expander structured to convert energy from the heat transferred to the working fluid from the engine cooling fluid to mechanical energy,
     a condenser positioned along the working fluid circuit downstream of the expander, the condenser structured to cool the working fluid, and
     a charge air cooler positioned along the working fluid circuit downstream of the condenser and upstream of the coolant heat exchanger,
   wherein the working fluid circuit further comprises:
     a working fluid passage structured to fluidly couple each of the second pump, the coolant heat exchanger, the expander, the condenser, and the charge air cooler, and
     an expander bypass passage comprising an inlet fluidly coupled to the working fluid passage downstream of the charge air cooler and upstream of the coolant heat exchanger and an outlet fluidly coupled to the working fluid passage upstream of the condenser and downstream of the expander, the expander bypass passage structured to controllably bypass the working fluid around the expander.

2. The system of claim 1, wherein the charge air cooler is structured to receive charge air from a compressor of a turbocharger and to transfer heat from the charge air to the working fluid.

3. The system of claim 1, further comprising:
an exhaust gas recirculation passage structured to fluidly couple to an exhaust manifold of the engine, the exhaust gas recirculation passage structured to receive exhaust gas from the exhaust manifold and transmit the exhaust gas to an intake manifold of the engine, and
wherein the waste heat recovery system further comprises an exhaust gas recirculation heat exchanger positioned along the working fluid circuit downstream of the coolant heat exchanger and upstream of the expander, the exhaust gas recirculation heat exchanger fluidly coupled to the exhaust gas recirculation passage and structured to transfer heat from the exhaust gas to the working fluid.

4. The system of claim 3, wherein the charge air cooler is further structured to receive the exhaust gas from the exhaust gas recirculation passage and to transfer heat from the exhaust gas to the working fluid.

5. The system of claim 1, wherein the working fluid circuit further comprises:
a charge air cooler bypass passage comprising an inlet fluidly coupled to the working fluid passage upstream of the charge air cooler and an outlet fluidly coupled to the working fluid passage downstream of the charge air cooler; and
a charge air cooler bypass valve operatively coupled to the charge air cooler bypass passage, the charge air cooler bypass valve structured to control fluid flow through the charge air cooler bypass passage so as to bypass the working fluid around the charge air cooler.

6. The system of claim 1,
wherein the second pump is a low pressure pump, and
wherein the working fluid circuit further comprises a high pressure pump positioned downstream of the low pressure pump.

7. The system of claim 6, wherein the working fluid circuit further comprises:
a high pressure line structured to fluidly couple each of the low pressure pump, the high pressure pump, the charge air cooler, and the expander; and
a low pressure line structured to fluidly couple each of the low pressure pump, the coolant heat exchanger, and the expander.

8. The system of claim 7, wherein the waste heat recovery system further comprises a tailpipe exhaust heat exchanger fluidly coupled to the high pressure line downstream of the charge air cooler and upstream of the exhaust gas recirculation heat exchanger, the tailpipe exhaust heat exchanger also fluidly coupled to an exhaust passage so as to receive hot exhaust gas from the engine, the tailpipe exhaust heat exchanger structured to transfer heat from the exhaust gas to the working fluid so as to cool the exhaust gas and further heat the working fluid.

9. A system, comprising:
an engine cooling system, comprising:
an engine cooling circuit comprising a first pump structured to circulate an engine coolant fluid through the engine cooling circuit,
a remote coolant radiator positioned along the engine cooling circuit downstream of an engine and positioned outside of a vehicle cooling package area, the remote coolant radiator structured to transfer heat from the engine coolant fluid to air flowing through the remote coolant radiator, and
a coolant heat exchanger positioned along the engine cooling circuit in parallel to the remote coolant radiator and upstream of the engine; and
a waste heat recovery system, comprising:
a working fluid circuit comprising a second pump structured to circulate a working fluid through the working fluid circuit,
the coolant heat exchanger positioned along the working fluid circuit and structured to transfer heat from the engine coolant fluid to the working fluid,
an expander positioned along the working fluid circuit downstream of the coolant heat exchanger, the expander structured to convert energy from the heat transferred to the working fluid from the engine cooling fluid to mechanical energy,
a condenser positioned along the working fluid circuit downstream of the expander, the condenser structured to cool the working fluid, and
a charge air cooler structured to receive charge air from a compressor of a turbocharger, the charge air cooler positioned along the working fluid circuit downstream of the condenser and upstream of the coolant heat exchanger, the charge air cooler structured to transfer heat from the charge air to the working fluid,
wherein the working fluid circuit further comprises:
a working fluid passage structured to fluidly couple each of the second pump, the coolant heat exchanger, the expander, the condenser, and the charge air cooler;
an expander bypass passage comprising an inlet fluidly coupled to the working fluid passage downstream of the coolant heat exchanger and an outlet fluidly coupled to the working fluid passage upstream of the condenser and downstream of the expander; and
an expander bypass valve operatively coupled to the expander bypass passage, the expander bypass valve structured to control fluid flow through the expander bypass passage so as to bypass the working fluid around the expander.

10. A system, comprising:
an engine cooling system, comprising:
an engine cooling circuit comprising a first pump structured to circulate an engine coolant fluid through the engine cooling circuit,
a remote coolant radiator positioned along the engine cooling circuit downstream of an engine and positioned outside of a vehicle cooling package area, the remote coolant radiator structured to transfer heat from the engine coolant fluid to air flowing through the remote coolant radiator, and
a coolant heat exchanger positioned along the engine cooling circuit in parallel to the remote coolant radiator and upstream of the engine; and
a waste heat recovery system, comprising:
a working fluid circuit comprising a second pump structured to circulate a working fluid through the working fluid circuit,
the coolant heat exchanger positioned along the working fluid circuit and structured to transfer heat from the engine coolant fluid to the working fluid, an expander positioned along the working fluid circuit downstream of the coolant heat exchanger, the expander structured to convert energy from the heat transferred to the working fluid from the engine cooling fluid to mechanical energy, a condenser positioned along the working fluid circuit downstream of the expander, the condenser structured to cool the working fluid, a charge air cooler structured to receive charge air from a compressor of a turbocharger, the charge air cooler positioned along the working fluid circuit downstream of the condenser and upstream of the coolant heat exchanger, the charge air cooler structured to transfer heat from the charge air to the working fluid, wherein the second pump is a low pressure pump, wherein the working fluid circuit further comprises:
  a high pressure pump positioned downstream of the low pressure pump,
  a high pressure line structured to fluidly couple each of the low pressure pump, the high pressure pump, the charge air cooler, and the expander; and
  a low pressure line structured to fluidly couple each of the low pressure pump, the coolant heat exchanger, and the expander, and wherein the expander is a dual entry expander, comprising:
  a first inlet fluidly coupled to the high pressure line; and
  a second inlet fluidly coupled to the low pressure line.

11. A system, comprising:

an engine cooling system, comprising:
  an engine cooling circuit comprising a first pump structured to circulate an engine coolant fluid through the engine cooling circuit,
  a remote coolant radiator positioned along the engine cooling circuit downstream of an engine and positioned outside of a vehicle cooling package area, the remote coolant radiator structured to transfer heat from the engine coolant fluid to air flowing through the remote coolant radiator, and
  a coolant heat exchanger positioned along the engine cooling circuit in parallel to the remote coolant radiator and upstream of the engine; and a waste heat recovery system, comprising:
  a working fluid circuit comprising a second pump structured to circulate a working fluid through the working fluid circuit,
  the coolant heat exchanger positioned along the working fluid circuit and structured to transfer heat from the engine coolant fluid to the working fluid,
  an expander positioned along the working fluid circuit downstream of the coolant heat exchanger, the expander structured to convert energy from the heat transferred to the working fluid from the engine cooling fluid to mechanical energy,
  a condenser positioned along the working fluid circuit downstream of the expander, the condenser structured to cool the working fluid,
  a charge air cooler structured to receive charge air from a compressor of a turbocharger, the charge air cooler positioned along the working fluid circuit downstream of the condenser and upstream of the coolant heat exchanger, the charge air cooler structured to transfer heat from the charge air to the working fluid, wherein the second pump is a low pressure pump, wherein the working fluid circuit further comprises:
  a high pressure pump positioned downstream of the low pressure pump,
  a high pressure line structured to fluidly couple each of the low pressure pump, the high pressure pump, the charge air cooler, and the expander; and
  a low pressure line structured to fluidly couple each of the low pressure pump, the coolant heat exchanger, and the expander, and wherein the waste heat recovery system further comprises a liquid separator positioned downstream of the coolant heat exchanger and upstream of the expander, the liquid separator structured to separate a liquid phase of the working fluid from a gaseous phase of the working fluid, the liquid separator comprising:
  an inlet fluidly coupled to the low pressure line to receive the working fluid from the coolant heat exchanger;
  a first outlet fluidly coupled to the expander, the liquid separator structured to transmit the gaseous phase of the working fluid to the expander via the first outlet; and
  a second outlet fluidly coupled to the condenser via an expander bypass line that bypasses flow around the expander, the liquid separator structured to transmit the liquid phase of the working fluid to the condenser via the second outlet.

12. A system, comprising:

an engine cooling system, comprising:
  an engine cooling circuit comprising a first pump structured to circulate an engine coolant fluid through the engine cooling circuit,
  a remote coolant radiator positioned along the engine cooling circuit downstream of an engine and positioned outside of a vehicle cooling package area, the remote coolant radiator structured to transfer heat from the engine coolant fluid to air flowing through the remote coolant radiator, and
  a coolant heat exchanger positioned along the engine cooling circuit in parallel to the remote coolant radiator and upstream of the engine; and a waste heat recovery system, comprising:
  a working fluid circuit comprising a second pump structured to circulate a working fluid through the working fluid circuit,
  the coolant heat exchanger positioned along the working fluid circuit and structured to transfer heat from the engine coolant fluid to the working fluid,
  an expander positioned along the working fluid circuit downstream of the coolant heat exchanger, the expander structured to convert energy from the heat transferred to the working fluid from the engine cooling fluid to mechanical energy,
  a condenser positioned along the working fluid circuit downstream of the expander, the condenser structured to cool the working fluid,
  a charge air cooler structured to receive charge air from a compressor of a turbocharger, the charge air cooler positioned along the working fluid circuit downstream of the condenser and upstream of the coolant heat exchanger, the charge air cooler structured to transfer heat from the charge air to the working fluid, wherein the second pump is a low pressure pump, wherein the working fluid circuit further comprises:
  a high pressure pump positioned downstream of the low pressure pump,
  a high pressure line structured to fluidly couple each of the low pressure pump, the high pressure pump, the charge air cooler, and the expander; and a low pressure line structured to fluidly couple each of the low pressure pump, the coolant heat exchanger, and the expander, and wherein the working fluid circuit further comprises:
an expander bypass line comprising an inlet fluidly coupled to the high pressure line downstream of the charge air cooler and an outlet fluidly coupled to the high pressure line upstream of the condenser; and
an expander bypass valve operatively coupled to the expander bypass line, the expander bypass valve structured to control fluid flow through the expander bypass line so as to bypass the working fluid around the expander.

13. A system, comprising:
an engine cooling system, comprising:
an engine cooling circuit comprising a first pump structured to circulate an engine coolant fluid through the engine cooling circuit,
a remote coolant radiator positioned along the engine cooling circuit downstream of an engine and positioned outside of a vehicle cooling package area, the remote coolant radiator structured to transfer heat from the engine coolant fluid to air flowing through the remote coolant radiator, and
a coolant heat exchanger positioned along the engine cooling circuit in parallel to the remote coolant radiator and upstream of the engine; and
a waste heat recovery system, comprising:
a working fluid circuit comprising a second pump structured to circulate a working fluid through the working fluid circuit,
the coolant heat exchanger positioned along the working fluid circuit and structured to transfer heat from the engine coolant fluid to the working fluid,
an expander positioned along the working fluid circuit downstream of the coolant heat exchanger, the expander structured to convert energy from the heat transferred to the working fluid from the engine cooling fluid to mechanical energy,
a condenser positioned along the working fluid circuit downstream of the expander, the condenser structured to cool the working fluid,
a charge air cooler structured to receive charge air from a compressor of a turbocharger, the charge air cooler positioned along the working fluid circuit downstream of the condenser and upstream of the coolant heat exchanger, the charge air cooler structured to transfer heat from the charge air to the working fluid,
wherein the second pump is a low pressure pump,
wherein the working fluid circuit further comprises:
a high pressure pump positioned downstream of the low pressure pump,
a high pressure line structured to fluidly couple each of the low pressure pump, the high pressure pump, the charge air cooler, and the expander; and
a low pressure line structured to fluidly couple each of the low pressure pump, the coolant heat exchanger, and the expander, and
wherein the charge air cooler comprises:
a first working fluid passage fluidly coupled to the high pressure line;
a second working fluid passage fluidly coupled to the low pressure line; and
a charge air passage fluidly coupled to the compressor of the turbocharger, wherein the charge air cooler is structured to transfer heat from the charge air in the charge air passage to the working fluid in each of the first and second working fluid passages.

14. The system of claim 13, wherein the charge air cooler further comprises:
wherein the first working fluid passage comprises:
a first inlet fluidly coupled to the high pressure pump via the high pressure line, and
a first outlet fluidly coupled to the expander via the high pressure line; and
wherein the second working fluid passage comprises:
a second inlet fluidly coupled to the low pressure pump via the low pressure line, and
a second outlet fluidly coupled to the coolant heat exchanger via the low pressure line.

15. The system of claim 14, wherein the working fluid circuit further comprises:
a high pressure charge air cooler bypass line comprising an inlet fluidly coupled to the high pressure line upstream of the charge air cooler and an outlet fluidly coupled to the high pressure line downstream of the charge air cooler; and
a high pressure charge air cooler bypass valve operatively coupled to the high pressure charge air cooler bypass line, the high pressure charge air cooler bypass valve structured to control fluid flow through the high pressure charge air cooler bypass line so as to bypass the working fluid from the high pressure line around the charge air cooler.

16. The system of claim 14, wherein the working fluid circuit further comprises:
a low pressure charge air cooler bypass line comprising an inlet fluidly coupled to the low pressure line upstream of the charge air cooler and an outlet fluidly coupled to the low pressure line downstream of the charge air cooler; and
a low pressure charge air cooler bypass valve operatively coupled to the low pressure charge air cooler bypass line, the low pressure charge air cooler bypass valve structured to control fluid flow through the low pressure charge air cooler bypass line so as to bypass the working fluid from the low pressure line around the charge air cooler.

17. A system, comprising:
an engine cooling system, comprising:
an engine cooling circuit comprising a first pump structured to circulate an engine coolant fluid through the engine cooling circuit,
a remote coolant radiator positioned along the engine cooling circuit downstream of an engine and positioned outside of a vehicle cooling package area, the remote coolant radiator structured to transfer heat from the engine coolant fluid to air flowing through the remote coolant radiator, and
a coolant heat exchanger positioned along the engine cooling circuit in parallel to the remote coolant radiator and upstream of the engine; and
a waste heat recovery system, comprising:
a working fluid circuit comprising a second pump structured to circulate a working fluid through the working fluid circuit,
the coolant heat exchanger positioned along the working fluid circuit and structured to transfer heat from the engine coolant fluid to the working fluid,
an expander positioned along the working fluid circuit downstream of the coolant heat exchanger, the expander structured to convert energy from the heat transferred to the working fluid from the engine cooling fluid to mechanical energy, a condenser positioned along the working fluid circuit downstream of the expander, the condenser structured to cool the working fluid, a charge air cooler structured to receive charge air from a compressor of a turbocharger, the charge air cooler positioned along the working fluid circuit downstream of the condenser and upstream of the coolant heat exchanger, the charge air cooler structured to transfer heat from the charge air to the working fluid, wherein the second pump is a low pressure pump, wherein the working fluid circuit further comprises a high pressure pump positioned downstream of the low pressure pump, wherein the expander is a first expander;

wherein the waste heat recovery system further comprises a second expander; and wherein the working fluid circuit further comprises:
   a low pressure line structured to fluidly couple each of the low pressure pump, the coolant heat exchanger, and the first expander, and
   a high pressure line structured to fluidly couple each of the low pressure pump, the high pressure pump, the charge air cooler, and the second expander, the second expander fluidly coupled to the condenser.

18. A vehicle system, comprising:
an engine bay;
an engine positioned in the engine bay;
an engine cooling system, comprising:
   an engine cooling circuit comprising a first pump structured to circulate an engine coolant fluid through the engine cooling circuit, and
   a coolant heat exchanger positioned along the engine cooling circuit in parallel to a remote coolant radiator and upstream of the engine, the coolant heat exchanger structured to receive working fluid from a Rankine waste heat recovery system and to transfer heat from the engine coolant fluid to the working fluid; and
a charge air cooler positioned along the working fluid circuit downstream of a condenser and upstream of the coolant heat exchanger,
wherein the working fluid circuit further comprises:
   a working fluid passage structured to fluidly couple each of a second pump, the coolant heat exchanger, an expander, the condenser, and the charge air cooler; and
   an expander bypass passage comprising an inlet fluidly coupled to the working fluid passage downstream of the charge air cooler and upstream of the coolant heat exchanger and an outlet fluidly coupled to the working fluid passage upstream of the condenser and downstream of the expander, the expander bypass passage structured to controllably bypass the working fluid around the expander.

19. The vehicle system of claim 18, wherein the engine cooling system further comprises the remote coolant radiator positioned along the engine cooling circuit downstream of the engine, and positioned outside of the engine bay, the remote coolant radiator structured to transfer heat from the engine coolant fluid to air flowing through the remote coolant radiator.

20. The vehicle system of claim 18, wherein the vehicle system does not include a radiator positioned in the engine bay.

21. The vehicle system of claim 18, further comprising the Rankine waste heat recovery system comprising the condenser, wherein the condenser is structured to cool the working fluid so as to indirectly cool the engine coolant fluid.

22. The vehicle system of claim 21, wherein the condenser is positioned in the engine bay.

23. An engine cooling system, comprising:
an engine cooling circuit comprising a first pump structured to circulate an engine coolant fluid through the engine cooling circuit;
a coolant heat exchanger positioned along the engine cooling circuit in parallel to a remote coolant radiator and upstream of the engine, the coolant heat exchanger structured to receive working fluid from a Rankine waste heat recovery system and to transfer heat from the engine coolant fluid to the working fluid; and
a charge air cooler positioned along the working fluid circuit downstream of a condenser and upstream of the coolant heat exchanger,
wherein the working fluid circuit further comprises:
   a working fluid passage structured to fluidly couple each of a second pump, the coolant heat exchanger, an expander, the condenser, and the charge air cooler; and
   an expander bypass passage comprising an inlet fluidly coupled to the working fluid passage downstream of the charge air cooler and upstream of the coolant heat exchanger and an outlet fluidly coupled to the working fluid passage upstream of the condenser and downstream of the expander, the expander bypass passage structured to controllably bypass the working fluid around the expander.

24. The engine cooling system of claim 23, wherein the remote coolant radiator is positioned along the engine cooling circuit downstream of an engine and positioned outside of an engine bay, the remote coolant radiator structured to transfer heat from the engine coolant fluid to air flowing through the remote coolant radiator.

25. The engine cooling system of claim 23, wherein the vehicle system does not include a radiator positioned in an engine bay.

26. The engine cooling system of claim 23, further comprising the Rankine waste heat recovery system comprising the condenser, wherein the condenser is structured to cool the working fluid so as to indirectly cool the engine coolant fluid.

27. The engine cooling system of claim 26, wherein the condenser is positioned in an engine bay.

* * * * *